United States Patent [19]

Sanford

[11] 4,378,899
[45] Apr. 5, 1983

[54] TAPE DRIVE CAPSTAN
[75] Inventor: Herbert F. Sanford, Littleton, Colo.
[73] Assignee: Honeywell, Inc., Minneapolis, Minn.
[21] Appl. No.: 298,850
[22] Filed: Sep. 2, 1981
[51] Int. Cl.³ .............................................. B65H 17/22
[52] U.S. Cl. .................................. 226/188; 226/190; 226/193
[58] Field of Search .................................. 226/188–191, 226/193, 194; 106/39.5; 100/155 R, 155 G, 157, 162 R; 428/384; 242/206, 208–210, 192; 19/258, 259, 152

[56] References Cited
U.S. PATENT DOCUMENTS

| | | | |
|---|---|---|---|
| 3,499,998 | 3/1970 | Tanigawa et al. | 226/191 |
| 3,524,607 | 8/1970 | Furst et al. | 242/192 |
| 3,612,376 | 10/1971 | Johnson | 226/194 |
| 3,847,260 | 11/1974 | Fowler | 226/191 X |

Primary Examiner—Leonard D. Christian
Attorney, Agent, or Firm—Lockwood D. Burton; Mitchell J. Halista

[57] ABSTRACT

A tape drive capstan has a porous ceramic matrix in the form of a cylindrical shell using spherical ceramic particles bonded together to form a network of interstitial pores which are substantially uniform in size and interconnected. A urethane elastomer is impregnated into the pores to form a tape driving surface on the outside surface of the cylinder. The outer surface of the capstan is finish-ground to an outside diameter suitable for use in a tape drive apparatus. The particles occupy approximately 70% of the internal volume of the shell and the elastomer occupies the remaining 30%. The shell is attached by an epoxy to an outside surface of a drive shaft suitable for driving the capstan.

6 Claims, 2 Drawing Figures

TAPE DRIVE CAPSTAN

BACKGROUND OF THE INVENTION

Field of the Invention

The present invention relates to tape recorders. More specifically, the present invention is directed to a tape drive capstan for use in a tape recorder.

SUMMARY OF THE INVENTION

An object of the present invention is to provide an improved tape drive capstan.

In accomplishing this and other objects, there has been provided, in accordance with the present invention a tape drive capstan using a porous ceramic structure having a network of interconnected interstitial pores which are filled with an elastomer material to provide a tape drive surface on the outside surface of the capstan.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
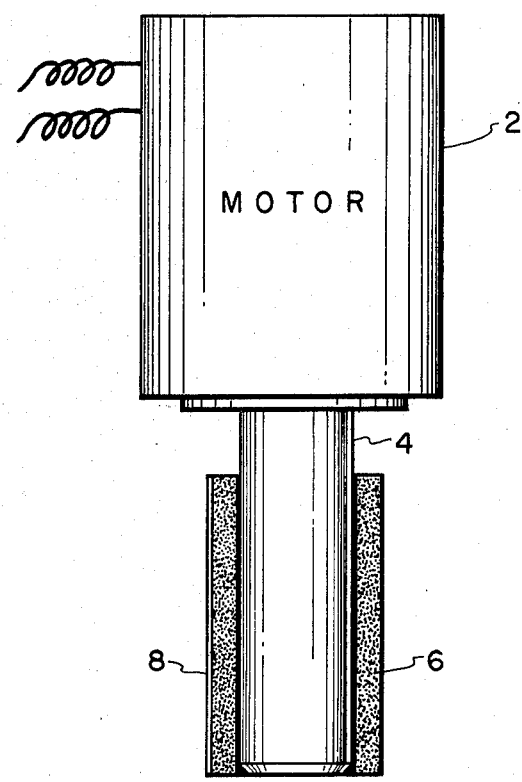
FIG. 1 is a pictorial illustration of a tape drive capstan embodying an example of the present invention and FIG. 2 is a magnified cross-section of a portion of a tape drive capstan shown in FIG. 1.

Referring to FIG. 1 in more detail, there is shown a tape drive apparatus including a tape drive capstan embodying an example of the present invention. A capstan drive motor 2, which is energized by any suitable motor drive means, has a motor shaft 4 extending outwardly from one end of the motor 2. A tape drive capstan 6 embodying an example of the present invention is mounted on the end of the motor shaft 4 to drive a recording tape 8 located in contact with an outer surface of the capstan 6.

Figure 2:
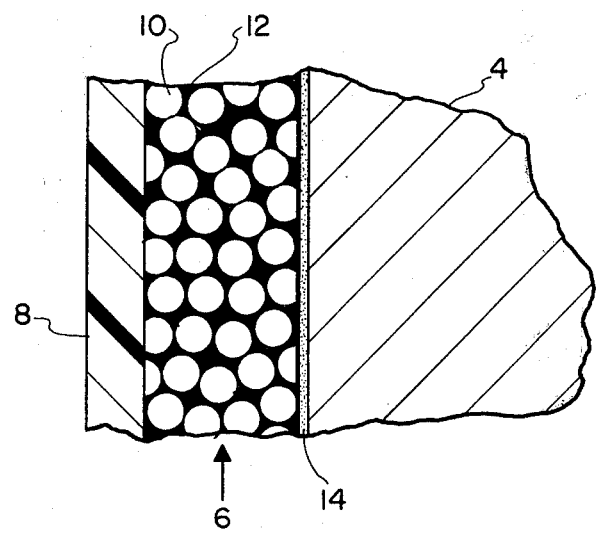

In FIG. 2, there is shown a magnified cross-section of a portion of the tape drive capstan 6 of FIG. 1. The tape drive capstan 6 includes a hollow cylindrical shell of a porous ceramic structure composed of spherical ceramic particles bonded together to produce a network of interstitial pores which are open and interconnected. A suitable material is the porous structure manufactured by Industrial Mineral Products Division of 3M, St. Paul, Minn. The spherical particles 12 form a stable structural cylinder which defines an interior volume suitable for being impregnated by a urethane elastomer 12. The elastomer can be infused into the pores of the cylinder by exposing the interior of the shell to a vacuum while the exterior of the cylinder is covered with an elastomer in a substantially liquid state. The elastomer 12 provides the frictional properties on the surface of the capstan 6 suitable for driving the recording tape 8. The surface of the capstan 6 after impregnation by the elastomer is finish-ground to produce an outside diameter of the cylinder suitable for use in the tape drive apparatus.

The capstan 6 is attached to the motor shaft 8 by a high viscosity epoxy 14 located between the inside surface of the cylindrical shell and the outside surface of the motor shaft 4. The epoxy 14 is selected to prevent wicking into the ceramic pores of the capstan 6 for any appreciable distance. The volume ratio in the capstan 6 is approximately seventy percent ceramic and thirty percent elastomer. This ratio is substantialy also present at the surface of the capstan 6 to provide a drive surface for the recording tape 8. Since the ceramic core formed by the particles 10 has a very low coefficient of thermal expansion, the finish-ground outside diameter of the shell forming the capstan 6 is very stable over the environmental temperature range experienced by the tape recorder. The ceramic matrix also provides a support for the elastomer 12 during the finish-grinding operation of the surface whereby the elastomer 12 is retained within the ceramic matrix. consequently, the finished capstan 6 exhibits frictional properties equal to an all rubber surface with, however, substantially superior stability and accuracy of dimension.

Accordingly, it may be seen, that there has been provided in accordance with the present invention, an improved tape drive capstan.

The embodiments of the invention in which an exclusive property or privilege is claimed are defined as follows:

1. A capstan comprising
   a matrix of ceramic particles forming a network of interstitial interconnected pores and
   an elastomer material substantially filling said pores to provide a surface on said matrix having a tape driving capability.

2. A capstan as set forth in claim 1 wherein said elastomer is a urethane elastomer.

3. A capstan as set forth in claim 1 wherein said matrix is a hollow cylindrical shell and further including a drive shaft and an adhesive for bonding said shell to said drive shaft.

4. A capstan as set forth in claim 1 wherein said particles are substantially spherical.

5. A capstan as set forth in claim 4 wherein said matrix is a hollow cylindrical shell.

6. A capstan as set forth in claim 1 wherein said particles are approximately 70 percent of the volume of said matrix and said elastomer substantially fills the remaining volume of said matrix.

* * * * *